J. ROCKE.
BELT GUIDE.
APPLICATION FILED OCT. 3, 1919.
1,399,578.
Patented Dec. 6, 1921.
2 SHEETS—SHEET 1.
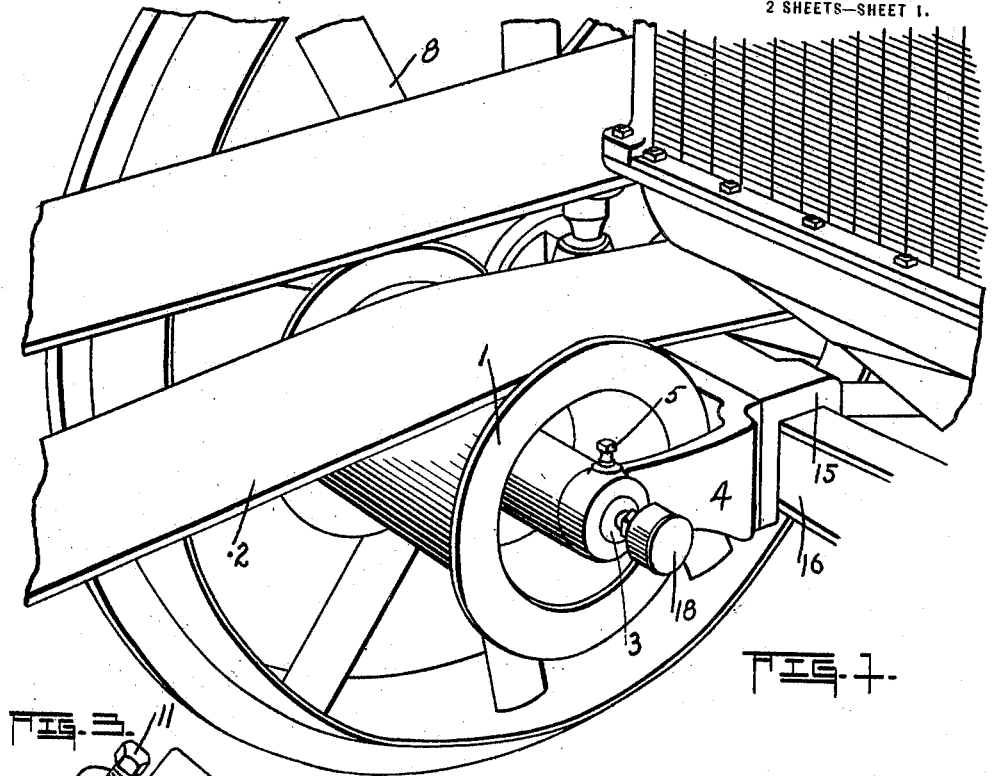
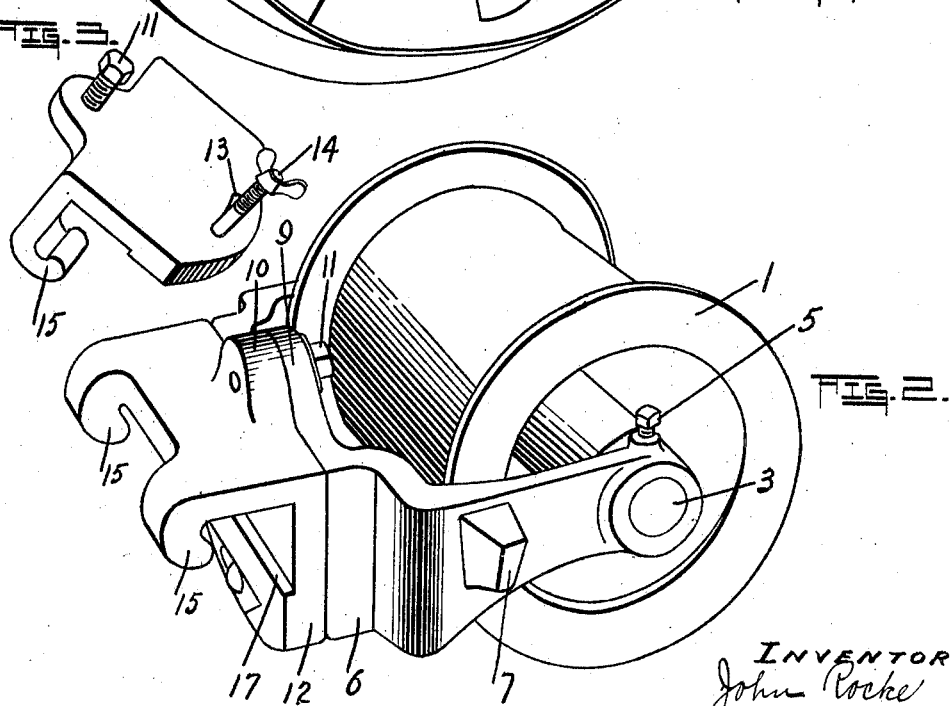
INVENTOR
John Rocke
By W. J. Teff
ATT'Y.

UNITED STATES PATENT OFFICE.

JOHN ROCKE, OF PONTIAC, ILLINOIS, ASSIGNOR, BY MESNE ASSIGNMENTS, TO ADOLPH WOCHNER, TRUSTEE, OF McLEAN COUNTY, ILLINOIS.

BELT-GUIDE.

1,399,578.

Specification of Letters Patent.   Patented Dec. 6, 1921.

Application filed October 3, 1919.   Serial No. 328,300.

*To all whom it may concern:*

Be it known that I, JOHN ROCKE, a citizen of the United States of America, residing at Pontiac, in the county of Livingston and State of Illinois have invented certain new and useful Improvements in Belt-Guides, of which the following is a specification.

My invention relates generally to belt guides, but more particularly to belt guides in combination with an axle of a motor vehicle.

In the adaptation of the tractor or other motor vehicle for driving stationary machines, a pulley wheel is used on the rear axle and a driving belt is carried forward, riding over the front axle and connected to the machine to which motive power is being supplied. It has been found, however, that the belt which is necessarily mounted in such manner frequently runs off. Furthermore, the constant scraping on the axle wears the belt.

The object of my invention is to provide a device that will do away with the above belt troubles and one that is removable from the axle without adjustment. Another object of the invention is to provide a guide, for the belt, which is angularly adjustable, as belts of different lengths require slightly different angular bearings.

With the these objects in view, the invention consists in the novel construction, combination, and arrangement of parts herein fully described.

In the accompanying drawings—

Figure 1 is a perspective view, looking from a right side and forward position of the belt guide mounted in operable position on the front axle of a motor vehicle.

Fig. 2 is a perspective view, looking from a left side and rear position of the belt guide detached from the axle.

Fig. 3 is a detail perspective view of the attaching plate detached from the axle and belt wheel retaining plate.

Figure 4:
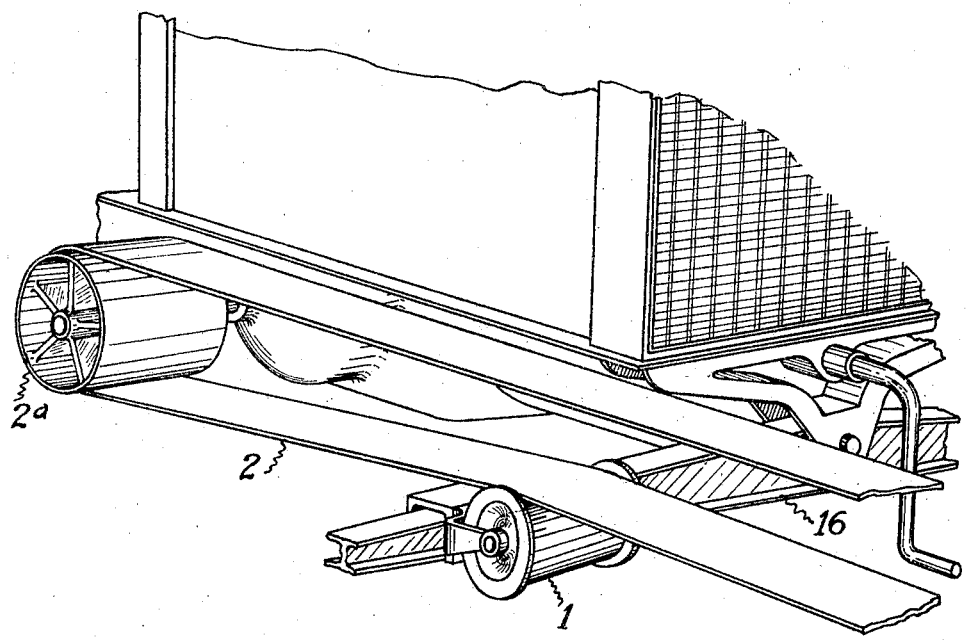
Fig. 4 is a perspective view of the device showing more completely the combination with the power driven pulley.

Referring to the drawings, 1 is a belt wheel supporting and guiding the driving belt 2, which is driven by the power pulley 2ᵃ mounted at a convenient point in the motor vehicle. The belt wheel revolves about the shaft 3, which is supported by the forwardly projecting arms 4 and held in position by the set screws 5, the projecting arms being integrally mounted on the plate 6. On the outer arm 4 is an outwardly projecting lug 7 protecting the belt from contact with the motor vehicle wheel 8, should it be accidentally turned toward the guide. The plate 6 has a rounded, upwardly extending projection 9, which, in conjunction with a similar portion 10 and a connecting bolt 11 on an attachment plate 12, forms a pivotal connection between the said plates.

The attachment plate has an arcuate slot 13, which in conjunction with a bolt 14, adapted to pass through the belt wheel supporting plate 6, serves to facilitate adjustment to meet any angle of the driving belt. Rearwardly extending hooked arms 15 on the attachment plate pass or carry over the top of the axle 16.

An abutment 17 on the inner side of the plate 12 hooks under the lower portion of the axle and is an additional aid in clamping the device on the axle and holding it in operable position. A grease cup 18 furnishes lubricating means for the belt wheel shaft.

What is claimed is:

1. In a device of the class described, a rotatable belt wheel, a plate having forwardly extending arms supporting said wheel, an outwardly projecting lug on one of said arms, an attachment plate having rearwardly extending hooked arms, and an abutment projecting from its rear surface, and an adjustable pivotal connection comprising a pivotal connection at the top portions of the plates, and an arcuate slot in said attachment plate in conjunction with a bolt adapted to pass through the belt wheel supporting plate.

2. In combination with an axle of a motor vehicle, a belt wheel, a plate having forwardly extending arms supporting said belt wheel, an outwardly projecting lug on one of said arms, an attachment plate having rearwardly extending hooked arms carrying over said axle, and an abutment on its rear surface hooking underneath said axle and an adjustable pivotal connection comprising a pivotal connection at the top portions of the plates and an arcuate slot in said attachment plate in conjunction with a bolt adapted to pass through the belt wheel supporting plate.

3. The combination with a power driven belt and pulley on a motor vehicle, and a movable front axle, of a belt wheel, a plate having means for supporting said wheel, an attachment plate having rearwardly extending hooked arms carrying over said axle and affording a detachable mounting therefor, and a positively adjustable means for pivoting said belt wheel supporting plate to said attachment plate.

4. The combination with a power driven belt and a pulley on a motor vehicle, and a front axle thereof of a belt guide comprising a pulley wheel, a base member, arms projecting from the front face of said base plate for supporting said wheel, rearwardly extending hooked arms carrying over said axle and affording a detachable mounting therefor, and an adjustable means for tilting the belt wheel, relative to the axle.

5. The combination with a power driven belt and pulley on a motor vehicle and a front axle, of a belt guide comprising a pulley wheel, a bracket member having arms projecting therefrom, said arms acting as a support for the belt wheel, and rearwardly extending hooked arms carrying over said axle and affording a detachable mounting therefor.

6. In a motor vehicle driving means in combination, a forwardly disposed axle for the vehicle, a power shaft disposed in a position rearwardly of said axle and substantially parallel thereto, an operating mechanism in advance of said supporting axle, a belt wheel on the driven member, a belt member thereon adapted to drive said operating mechanism, and a belt guide on said front axle.

7. In a motor vehicle driving means in combination, a forwardly disposed axle for the vehicle, a power shaft disposed in a position rearwardly of said axle and substantially parallel thereto, an operating mechanism in advance of said supporting axle, a belt wheel on the driven member, a belt member thereon adapted to drive said operating mechanism, a bracket member having a detachable mounting with the front axle and a belt wheel supported by said bracket in a plane parallel with that of said supporting axle.

8. In a motor vehicle driving means in combination, a driven member of a motor vehicle, an operating mechanism in advance of said motor vehicle, a vehicle supporting axle intermediate the driven member and the operating mechanism, said supporting axle and driven member being substantially parallel, a belt wheel on the driven member, a belt member thereon adapted to drive said operating mechanism, a bracket attached to the supporting axle and a belt wheel supported by said bracket.

In testimony whereof I have affixd my signature.

JOHN ROCKE